United States Patent [19]

Yasuda

[11] 4,361,874

[45] Nov. 30, 1982

[54] SCHEDULE TABLE PRINTING APPARATUS

[75] Inventor: Takeshi Yasuda, Akishima, Japan

[73] Assignee: Casio Computer Co., Ltd., Tokyo, Japan

[21] Appl. No.: 185,803

[22] Filed: Sep. 10, 1980

[30] Foreign Application Priority Data

Sep. 20, 1979 [JP] Japan .............................. 54-121419
Sep. 28, 1979 [JP] Japan .............................. 54-124186
Mar. 26, 1980 [JP] Japan .............................. 55-39315

[51] Int. Cl.³ .......................... G06F 3/12; G06F 15/02
[52] U.S. Cl. ....................................... 364/710; 368/28
[58] Field of Search ........................... 364/710; 368/28

[56] References Cited

U.S. PATENT DOCUMENTS

| 4,044,228 | 8/1977 | Kishimoto et al. | 364/710 |
| 4,237,541 | 12/1980 | Mikada | 364/710 |
| 4,274,146 | 6/1981 | Yanagawa | 364/710 X |
| 4,283,769 | 8/1981 | Asada | 364/710 |

Primary Examiner—David H. Malzahn
Attorney, Agent, or Firm—Frishauf, Holtz, Goodman & Woodward

[57] ABSTRACT

The time range data for the scheduling range of a schedule table is input from a keyboard. The numerical data is renewed within the scheduling range. Every time the numerical data is renewed, the numeral is printed on a recording paper, one line after another. The operation for preparation of the schedule table is terminated when the numerical data exceeds the scheduling range.

11 Claims, 13 Drawing Figures

|   | 14 | 13 | 12 | 11 | 10 | 9 | 8 | 7 | 6 | 5 | 4 | 3 | 2 | 1 | 0 |
|---|----|----|----|----|----|---|---|---|---|---|---|---|---|---|---|
| X | 13~15 | DATE DATA 1~31 | | 15 | 15 | 15 | 15 | 15 | 14 | 15 | 15 | 15 | 15 | 15 | 15 |

Y

↖ DATE DATA REPRESENTING A PRECEDING MONTH

Z — — — — — — — — — — — — — — 0~6

↖ DATE DATA REPRESENTING A LAST DAY OF A PRESENT MONTH

|   | 15 | 14 | 13 | 12 | 11 | 10 | 9 | 8 | 7 | 6 | 5 | 4 | 3 | 2 | 1 | 0 |
|---|----|----|----|----|----|----|---|---|---|---|---|---|---|---|---|---|
| X | 0 | B | 9 | : | 0 | 0 | B | B | B | B | B | B | B | B | B | B |
| Y | 0 | 0 | 0 | 0 | 3 | 0 | 0 | 0 | 0 | 0 | 0 | 0 | 0 | 0 | 0 | 0 |
| Z | 0 | 1 | 9 | 7 | 9 | – | 8 | – | 3 | 0 | B | B | B | B | B | B |
| A | 0 | – | – | – | – | – | – | – | – | – | – | – | – | – | – | – |
| B | 0 | 1 | 5 | : | 0 | 0 | 0 | 0 | 0 | 0 | 0 | 0 | 0 | 0 | 0 | 0 |

SCHEDULE TABLE PRINTING APPARATUS

BACKGROUND OF THE INVENTION

The present invention relates to a schedule table printing apparatus for automatically printing a schedule table covering a specified period of time.

In general, in offices, calendar schedule tables for writing down the daily schedule and time schedules for writing down the hourly schedule are prepared. However, the preparation of such schedule tables has required much labor since it has been done manually. Moreover, since the time period and hours for each schedule varies for each individual, the same forms cannot be used for every person. Thus, manual preparation of the schedule tables has been cumbersome.

SUMMARY OF THE INVENTION

It is, therefore, the object of the present invention to provide a schedule table printing apparatus for automatically preparing a schedule table of a specified time period by simple key operations.

To the above and other ends, the present invention provides a schedule table printing device comprising:

A schedule table printing apparatus of the present invention comprises a keyboard for entering data defining the period of time assigned to a table to be printed; first memory means coupled to the keyboard for storing data entered by operating the keyboard; data entering means coupled to the first memory means for entering, by operating the keyboard, data representing regular intervals within the period of time represented by data read from the first memory means; second memory means coupled to the data entering means for storing data read out from the data entering means; and printing means coupled to the second memory means for printing data read out from the second memory means, the data read out from the second memory means being printed one by one as they are sequentially supplied from the second memory means, the printing means further including means for feeding a sheet of paper for a distance corresponding to the regular interval, upon printing one data read out from the second memory means.

With this construction, a schedule table may be immediately prepared when an operator inputs data for a desired (i.e., time period). Consequently, it is easy to obtain a schedule table for a required range or period of time in a simple manner. Moreover, since blank space is included in the prepared schedule table, further scheduling may be written, providing a wide range of application in offices.

BRIEF DESCRIPTION OF THE DRAWINGS

FIGS. 5 and 8 are views showing a prepared calendar schedule table;

FIGS. 6 and 9 are views illustrating the manner in which the information is stored in the RAM 7 of the calculator;

FIGS. 11 and 12 are views showing a prepared time schedule table.

DETAILED DESCRIPTION OF THE PREFERRED EMBODIMENTS

Figure 1:
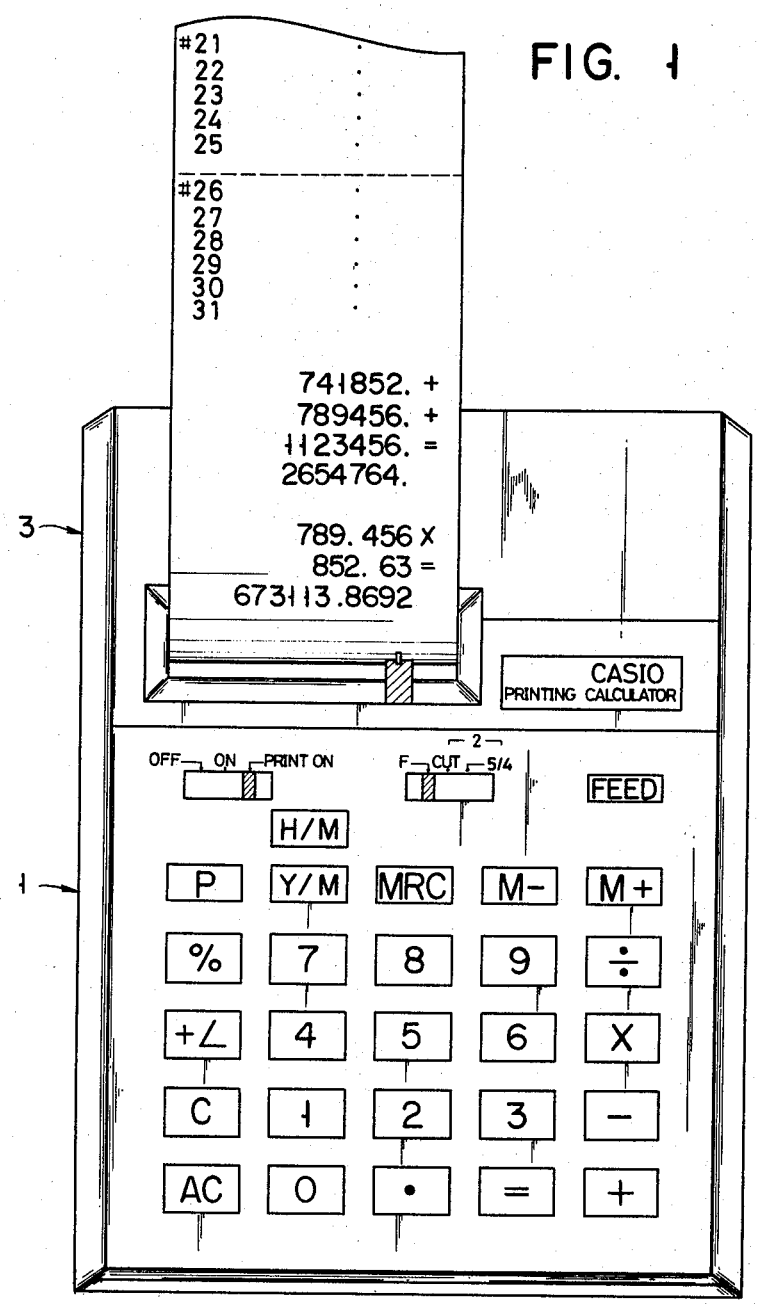
FIG. 1 is a view illustrating the outer appearance of a printing calculator.

FIG. 1 is a view illustrating the outer appearance of a printing calculator wherein numeral 1 denotes an input part. This operation panel has entry keys for inputting numerals of 0-9; a $\boxed{Y/M}$ key for inputting the year and month for preparing a calendar schedule table; and an $\boxed{H/M}$ key for inputting the hour and minute for preparing a time schedule; and so on. Numeral 3 denotes a printing part for printing a schedule table on recording paper.

Figure 2:
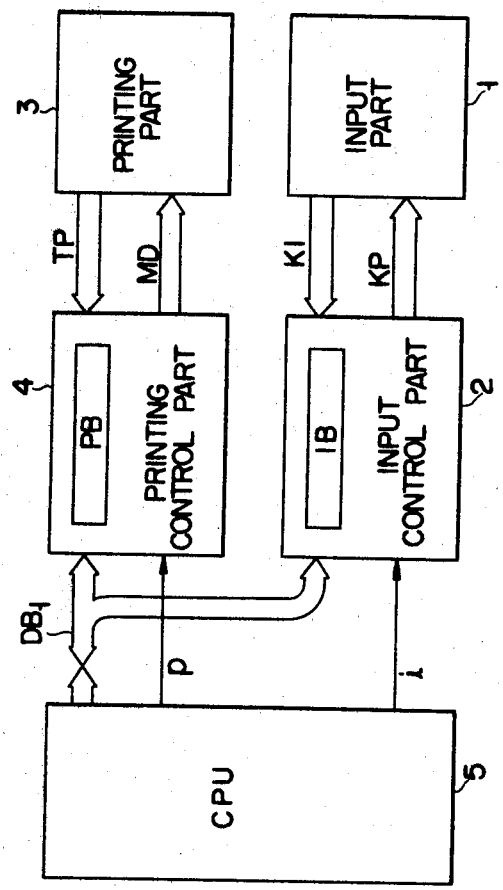
FIG. 2 is a block diagram of the printing calculator of FIG. 1.

FIG. 2 is a block diagram of the printing calculator. To the input part 1 is supplied, from an input control part 2, a timing signal KP for sampling. Upon the key operation at the input part 1, a timing signal KP is selected according to the operated keys and is supplied as a key input signal KI to an input buffer register IB provided at the input control part 2. The printing part 3 is connected to a printing control part 4 for supplying a printing position signal TP from a printing drum (not shown) provided in the printing part 3 to the printing control part 4. The printing control part 4 supplies to the printing part 3 a printing drive signal MD generated when the printing position signal TP corresponds to the printing data in the printing buffer register PB. A predetermined hammer is driven in response to the printing drive signal MD so that the printing part 3 executes a printing operation for preparing a schedule table on recording paper.

The input control part 2 and the printing control part 4 are connected to a CPU (central processing unit) 5 through a data bus line DB1. The CPU 5 supplies an input control signal i to the input control part 2 for writing the data stored in the input buffer register IB through the data bus line DB1. The CPU 5 also supplies a printing control signal p to the printing control part 4 for writing the printing data in the CPU 5 to the printing buffer register PB through the data bus line DB1.

Figure 3:
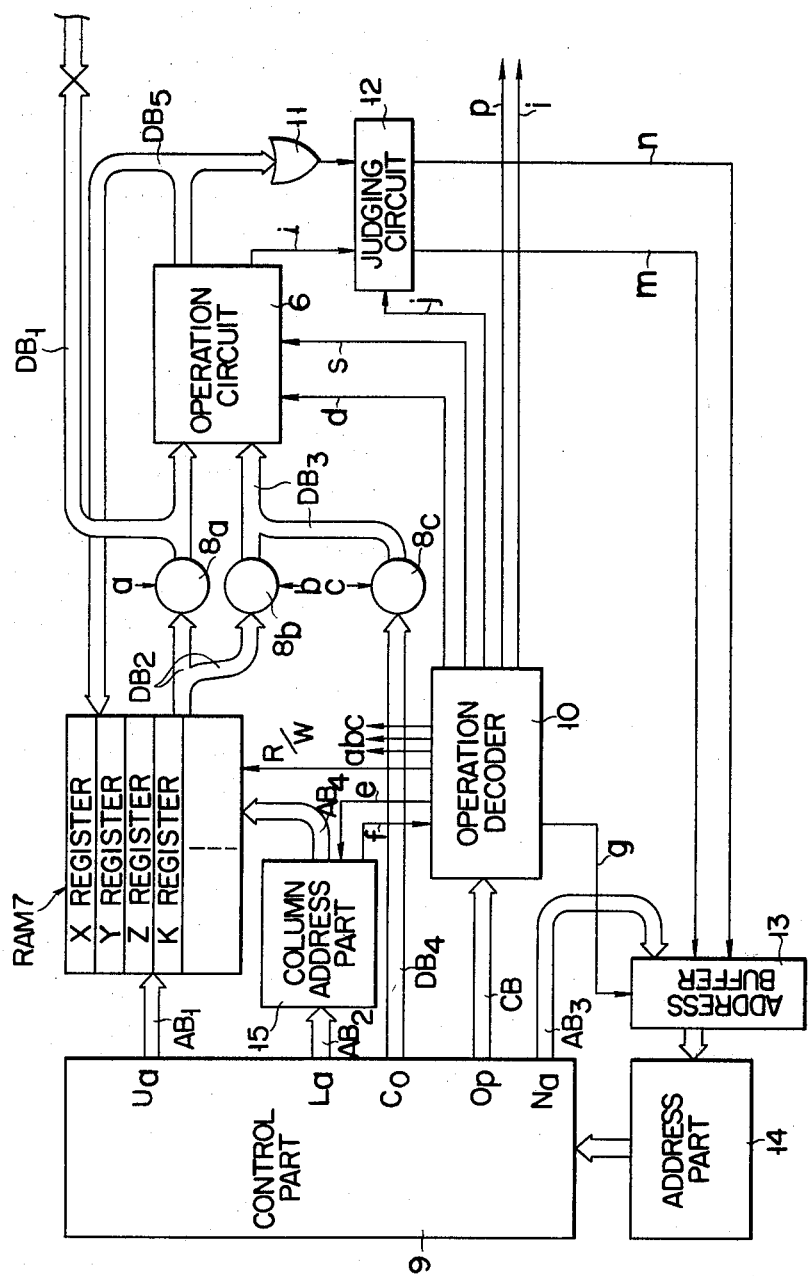
FIG. 3 is a block diagram of the central processing unit of the printing calculator of FIG. 1.

FIG. 3 is a block diagram illustrating the CPU 5 in more detail. The data supplied from the input control part 2 through the data bus line DB1 are inputted to an operation circuit 6 in the CPU 5. Data read out from an RAM 7 (random access memory) is supplied through a data bus line DB2 and a gate circuit 8a to the operation circuit 6. The same data is supplied through the data bus line DB2, a gate circuit 8b and a data bus line DB3 to the operation circuit 6. A numerical code C0 is supplied from a control part 9 through a data bus line DB4, a gate circuit 8c, and the data bus line DB3 to the operation circuit 6. Control signals s, d are supplied from an operation decoder 10 to the operation circuit 6. Of these, the control signal s executes selection between addition and subtraction of the data supplied through the data bus lines DB1 and DB3; and the control signal d selects whether to execute operations of these data in BCD (binary-coded decimal) notation or in hexadecimal notation. The operation circuit 6 outputs a parallel signal of 4 bits which is fed through a data bus line DB5 to the RAM 7 and through an OR circuit 11 to a judging circuit 12. A carry signal from the operation circuit 6 is also supplied through a signal line to this judging circuit 12. When a control signal j is fed from the operation decoder 10 to the judging circuit 12, the judging circuit 12 judges the presence or absence of the carry signal and the parallel 4 bit signal; when these signals are present, it supplies judging signals m, n to an address buffer 13.

The control part 9 has micro-instructions for sequentially executing various control operations, and its address is specified by an address part 14 for sequentially outputting the micro-instructions. From the control part 9 a line address signal Ua is supplied through an address bus line AB1 to the RAM 7 for specifying the line address. A column address signal La is also outputted to a column address part 15 through an address bus line AB2. Further, an operation code Op is supplied from the control part 9 to the operation decoder 10 through control bus line CB. A next address signal Na is outputted to the address buffer 13 through an address bus line AB3.

The column address part 15 has an address counter for storing the column address signal La fed from the control part 9 as an initial value, and the contents of the address counter specify one of the addresses 0–15 of the RAM 7 through an address bus line AB4. To the column address part 15 is also supplied with a control signal e from the operation decoder 10. When this signal e is outputted, the address counter starts counting from the above-mentioned initial value. When the final address is specified, it detects that the final address is specified by the column address part 15 and feeds a detection signal f to the operation decoder 10.

The operation decoder 10 reads the operation code Op fed from the control part 9 to provide various control signals. It also outputs the input control signal i and the printing control signal p, and an R/W signal for specifying reading/writing in RAM 7, and gate control signals a, b, and c for controlling the closing and opening of the gate circuits 8a, 8b, and 8c. When the detection signal f is fed from the column address part 15 to the operation decoder 10, the operation decoder 10 feeds a control signal g to the address buffer 13. The address buffer 13, according to the judging signals m, n fed from the judging circuit 12, changes the address value and writes a next address signal Na supplied from the control part 9 at a timing according to which the control signal e may be produced from the operation decoder 10. The next address signal Na is supplied to an address part 14.

The RAM 7 has various registers, i.e. an X register, a Y register, a Z register, a K register, and so on, corresponding to each line address. Each register corresponds one digit with column addresses 0–15 and has a memory capacity of 16 digits, each digit being 4 bits. For preparing a calandar schedule table, the date information of year and month is stored in the digits X6–X12 of the X register. A code for specifying the printing of a symbol "#" representative of Sunday is stored in the digit X14. A code for specifying the printing of a decimal point "." is stored in the digit X6. A blanking code which specifies non-printing is stored in each of the digits X0–X14. A minus code "−" is stored in the digits Y0–Y14 of the Y register. Data representing the day of the week corresponding to the first day of the month is stored in the digit Z0 of the Z register, a flag is stored in the digit Z1, and data representing the date of the last day of the month is stored in the digits Z12–Z13.

Figure 4:
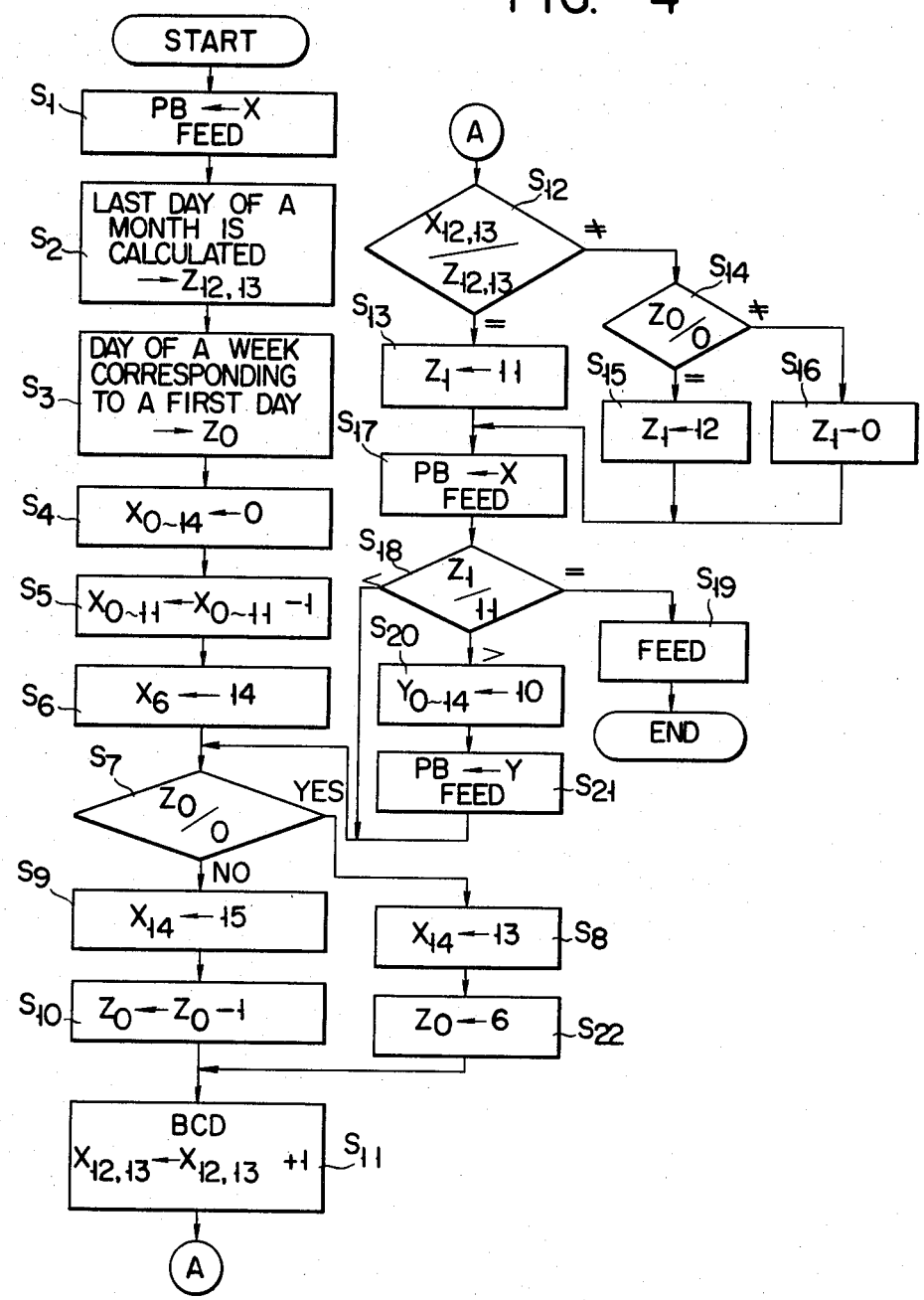
FIGS. 4, 7A and 7B are flow charts explaining the preparation operation of a calendar schedule table.

A first embodiment of the printing calculator of this construction will be described. For preparing a calendar schedule for August of 1979, entry keys of the keyboard 1 are operated to input $\boxed{1}$, $\boxed{9}$, $\boxed{7}$, and $\boxed{9}$; thereafter, the $\boxed{Y/M}$ key is operated, and finally the entry key is operated to input $\boxed{8}$. Then the input data are supplied to the RAM 7 set in the writing mode, through the input control part 2, the data bus line DB1, the operation circuit 6, and the data bus line DB5. The date information of "1979-08" is stored in the digits X6–X12 of the X register. When the $\boxed{Y/M}$ key is operated next, a step S1 as shown in the flow chart of FIG. 4 is executed.

Figure 5:
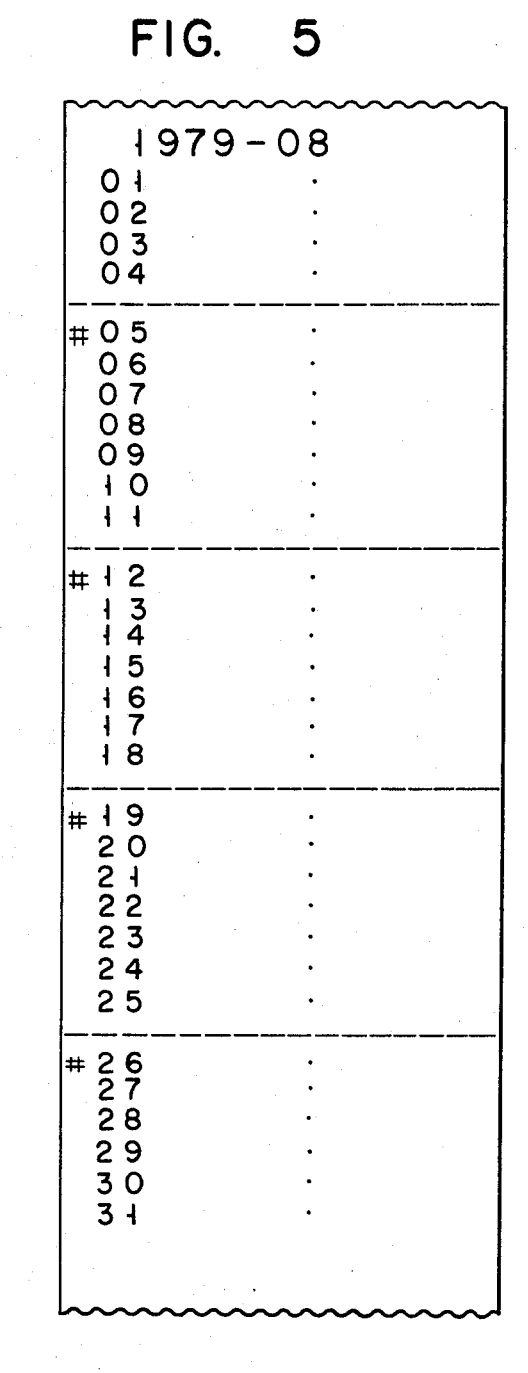

In executing step S1, according to the address signal specified by the address part 14, the operation code Op is fed from the control part 9 to the operation decoder 10 and is read out. As a result, the operation decoder 10 feeds a reading signal to the RAM 7, the control signal e to the column address part 15, the printing control signal p to the printing control part 4, and the gate control signal a to the gate circuit 8a for opening the gate. Simultaneously with this, the line address signal Ua is fed from the control part 9 to the RAM 7 for specifying the X register. At the same time, the column address signal La is supplied to the column address part 15. At this column address part 15, the date information is read out from the digits X12–X6 is supplied to the printing buffer register PB in the printing control part 4 through the data bus line DB2, the gate circuit 8a, and the data bus line DB1. Thus, the printing drive signal MD based on the contents of the printing buffer register PB, is supplied to the printing part 3. After "1979-08" is printed on a recording paper as shown in FIG. 5, the recording paper is fed out by a distance corresponding to one line.

Next a step S2 is executed. The data of the year and month stored in the X register is read out and is fed to the operation circuit 6. Based on this data, judgements are made on whether or not this month has 31 days and whether or not this year is a leap year. As a result, the last day of this month is calculated and is written in the digits Z12, Z13 of the register. In the case of August, "31" is calculated as the date of the last day of the month and is written in the digits Z12, Z13.

Next, a step S3 is executed. Based on the data of the year and month, the day of the week corresponding to the first day of the month is calculated in the operation circuit 6. The calculation of the day of the week is performed by calculating the number of days from a reference data to the desired date, correcting the calculated number of days, and dividing it by "7". For example, if the reference data is set to be March 1, of the year 0 of the Christian era, the number of days from this reference data to day c of month b of year a of the Christian era may be obtained by the following relations:

the number of days is, when $b \geq 3$, $$365.25 \times a + 30.6 \times (b-3) + c \tag{1}$$

and, when $b < 3$, $$365.25 \times (a-1) + 30.6 \times (b+9) + c \tag{2}$$

In calculating with these relations (1) and (2), the year (the first item) is calculated by omitting figures after the decimal point, and the month (the second item) is calculated by counting fractions of 0.5 or more as a unit and omitting smaller figures. The number of days obtained by either of these relations is corrected by adding 1. The obtained value is divided by "7". The day of the week may then be obtained by correspondence of the remainder "0"–"6" with the day of the week. In the case of Aug. 1, 1979, the number of days from the reference date "722983" is calculated by substituting a=1979, b=8, and c=1. The number of days obtained by adding 1 to this number, "722984", is divided by 7 and the remainder 3 is obtained. This remainder represents the day of the week. That is, Aug. 1, 1979 is calculated to be a Wednesday. This result is supplied to the RAM 7 through the data bus line DB5. The binary number (0011) for the data "3" is written in the digit Z0 of the Z register specified by the line address signal Ua and the column address signal La supplied by the control part 9.

Next, a step S4 is executed. "0" is stored in the digits X0–X14 of the X register. As a result, the data information stored in the digits X6–X12 is cleared. Next, a step S5 is executed. "1" is subtracted from the content "0" of the digits X0–X11 of the X register. The binary number (1111) for "15" is written as a blanking code in the digits X0–X11, each having a capacity of 4 bits. A step S6 is executed thereafter. The binary number (1110) for "14" is written as a decimal point code in the digit X6 of the X register. The numbers for codes will be hereinafter shown in decimal notation for the purpose of simplicity. However, they are similarly stored in binary as has been described.

Next, a step S7 is executed. Judgements are made on whether the content of the digit Z0 of the Z register is "0", that is, the day of the week of the first day of the month is a Sunday. If the answer is positive or "YES", a next step S8 follows; if the answer is negative or "NO", a next step S9 is executed. In the case of the example, since "4" is stored in the digit Z0, the answer is negative and the step S9 is executed. In the step S9, "15" as a blanking code is written in the digit X14 of the X register. A step S10 follows thereafter, and the day in the digit Z0 of the Z register is subtracted by 1. The previous value in the digit Z0 is replaced by the result value "3".

Next, a step S11 is executed. The control signals d, s are supplied from the operation decoder 10 to the operation circuit 6, so that the operation circuit 6 is set for addition in BCD notation. Thus, "1" is added to the contents of the digits X12, X13 of the X register, and the obtained value is then stored again in the digits X12, X13. Since "0" is stored in the digits X12, X13, the content of each becomes "01". A step S12 is then executed. A judgement is made on whether or not the contents of the digits X12, X13 are the same as the contents of the digits Z12, Z13 of the Z register, that is, whether the content "01" of the digits X12, X13 is the same as the date "31" of the last day of the month. If the answer is positive, a step S13 is executed, and if the answer is negative, a step S14 is executed. In the case of the example, the answer is negative so that the step S14 is executed. A judgement is made as to whether or not the content of the digit Z0 of the Z register is equal to 0, that is, whether the data stored in the digits X12, X13 of the X register are the data for Saturday. If the answer is positive, a step S15 is executed, and if the answer is negative, a step 16 is executed. In the case of the example, it is judged that the content of the digit Z0 is not equal to 0 since the content is "3". Thus, "0" is stored in the digit Z1 of the Z register.

Next, a step S17 is executed. The data stored in the digits X0–X14 of the X register is supplied to the printing buffer register PB of the input control part 2. "01" representing the date and "." representing the center of the space of the rest of the line are printed on the recording paper. The recording paper is fed out a distance corresponding to one line.

A next step S18 is executed. A judgement is made on whether or not the content stored in the digit Z1 of the Z register is equal to, more than, or less than "11". If it is judged to be equal to 11, a step S19 is executed; if it is judged to be greater than 11, a step S20 is executed; and if it is judged to be less than 11, the procedure goes back to step S7 for executing it. In the case of this example, since "0" is stored, the step S7 is executed.

During the execution of the step S7, if a negative judgement is made, the sequential steps S9, S10, and s11 are executed in the manner described above. In the step S12, it is judged that the content "02" of each of the digits X12, X13 is not equal to the content "31" of each of the digits Z12, Z13. In the step 14 to follow, the content "2" of the digit Z0 is judged not to be equal to "0". Next, the steps S16, S17 are executed. As a result, "02" and "." are printed on the recording paper, and the paper is fed out on line. In the step S18, it is judged that the content "0" of the digit Z1 is smaller than "11" so that the step S7 is executed for the third time. In the third operation, steps S9, S10, S11, S12, S14, S16, and S17 are executed in the same manner as described above. As a result, "03" and "." are printed on the next part of the recording paper. After feeding the recording paper for a distance corresponding to one line, the steps S18 and S7 are sequentially executed.

After executing the steps S7, S9, S10, S11, and S12 for the fourth time, during the execution of the step S14, the content of the digit Z0 is judged to be equal to "0". The next step S15 is thus executed. In the execution of the step S15, "12" is written in the digit Z1 of the Z register, and the next step S17 is executed. As a result, "04" and "." are printed on the next part of the recording paper, and the paper is fed out a distance corresponding to one line. During the execution of the step S18, the content of the digit Z1 is judged to be greater than "11" so that a step S20 is executed. During the execution of the step S20, data "10" specifying the printing of the bar code is written in the digits Y0–Y14 of the Y register. A next step 21 is then executed. The data stored in the Y register is supplied to the printing buffer register PB of the input control part 2 and is printed in two lines using the symbol "–" to represent the distinction between the first and second weeks on the next part of the recording paper. The paper is then fed out a distance corresponding to one line.

During the fifth execution of the step S7, the content of the digit Z0 is judged to be equal to "0". Then, during the execution of the step S8, the data "13" specifying the printing of the symbol "#" is written in the digit X14 of the X register. A step S22 is then executed. "6" corresponding to the day of the week is written in the digit Z0 of the Z register. Then the steps S11, S12, S14, S16 and S17 are executed. As a result, "#05" and representing Sunday and the number of days and "." are printed on the recording paper. After feeding the paper out a distance corresponding to one line, the steps S13 and S7 are executed.

A series of operations of the steps S7, S9, S10, S11, S12, S14, S16, S17 and S18 are repeated five times for sequentially printing the number of days "06" to "10" and ".". The steps S7, S9, S10, S11, S12, S14, S15, S17, S18, S20 and S21 are sequentially executed for printing "11" and "." on the recording paper. Thereafter, printing using "–" is performed on a new line. Then the steps S7, S8, S22, S11, S12, S14, S16, S17, and S18 are sequentially executed for printing "#12" and "." on the recording paper. After the thirtieth repetition of these operations, the steps S7, S9, and S10 are executed. During the execution of the step S11, the content of each of the digits Z12, Z13 is replaced by "31". The step S12 is executed, and the contents of the digits X12, X13 are judged to be equal to the contents of the digits Z12, Z13. The step S13 is then executed. During the execution of the step S13, "11" is written in the digit Z1 of the Z register. The step S17 is executed for printing "." and "31" representing the last day of the month on the recording paper. After feeding the recording paper out a distance corresponding to one line, the content of the digit Z1 is judged to be equal to "11" in the following step S18. Then the step 19 is executed, and a predetermined length of paper is fed to complete the preparation of the calendar schedule table for August of 1979. A calendar schedule as shown in FIG. 5 is issued.

In the first embodiment, a function was included for automatically calculating the day of the week for the first day of the month. However, the construction may be such that this date-calculating function is not provided and the date is specified by the key operations of the input part 1 by, for example, inputting $\boxed{3}$ for Wednesday after inputting August 1, 1979.

In the first embodiment described, the date data from the first to the last day of the month has been grouped in units of a week. When the first day of the month is not a Sunday or when the last day of the month is not a Saturday, the date printing starts in the middle of the week for the first day or terminates in the middle of the week for the last day. In such a case, the dates of the preceding or the following month corresponding to the day of the week of the first or the last week of the month are not shown. Thus, this is inconvenient for obtaining the date information of week. Moreover, the relation among the dates of the preceding, the present and the following month is not clear, resulting in inconvenience.

Thus, in a second embodiment of the present invention, when the first day of the present month is not a Sunday, the date data for one week from the last Sunday of the preceding month is obtained and printed. When the last day of the present month is not a Saturday, the date data for one week to the first Saturday of the following month is obtained.

FIG. 6 shows the X register, the Y register, and the Z register provided in the RAM 7. The digits of the respective registers correspond to the column addresses 0-14 and each register has a memory capacity of 15 digits, each digit having 4 bits. In the second embodiment, for preparing a calender schedule table, date data of 1-31 is stored in the digits X12, X13 of the X register. In the digit X14 is stored "13" for specifying the printing of a non-address symbol "#" representing Sunday, "14" for specifying the printing of the decimal point ".", or a blanking code "15". The date data representing the last day (28 to 31) of the preceding month is stored in the digits Y12, Y13 of the Y register. The data "10" representing the minus code "−" is stored in the digits Y0 to Y14. The date data representing the last day (28 to 31) of the present month is stored in the digits Z12, Z13 of the Z Register, and the data "0" to "6" (corresponding to Sunday through Saturday) representing the day of the week of the first day of the present month is stored in the digit Z0.

Figure 7A:
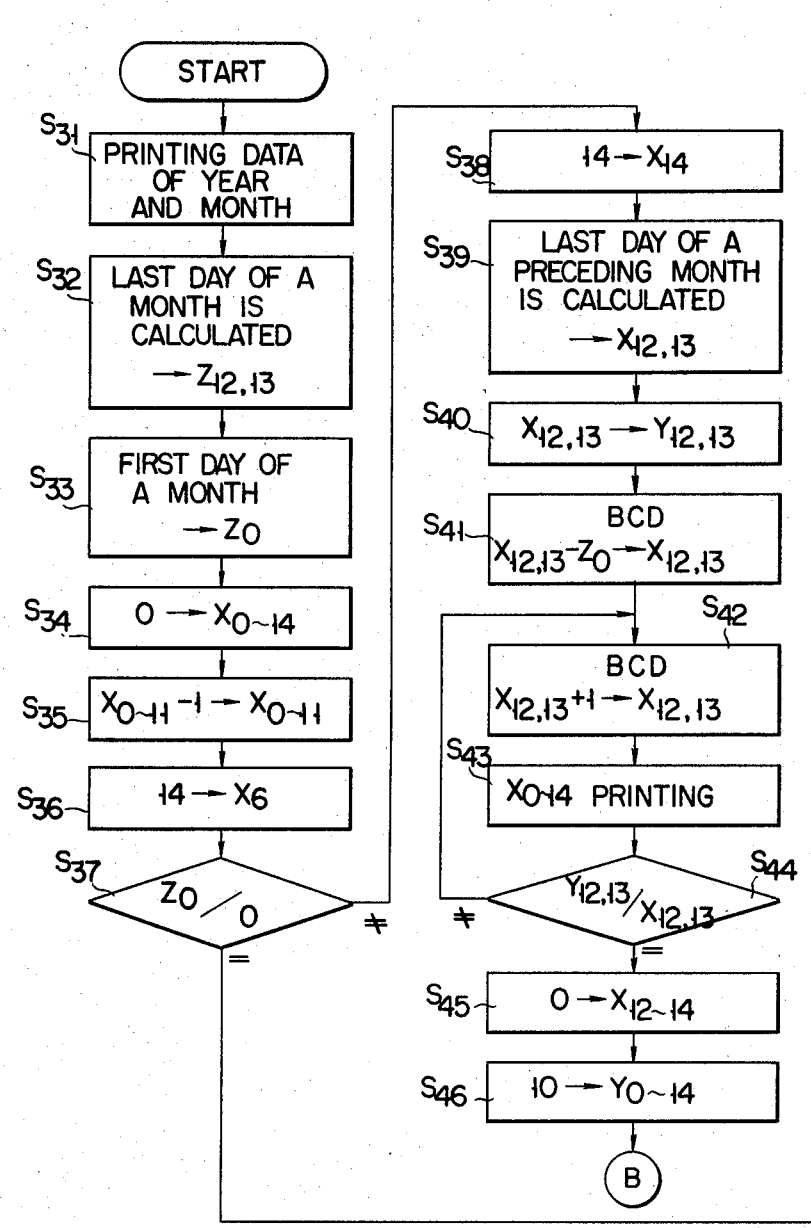
Figure 7B:
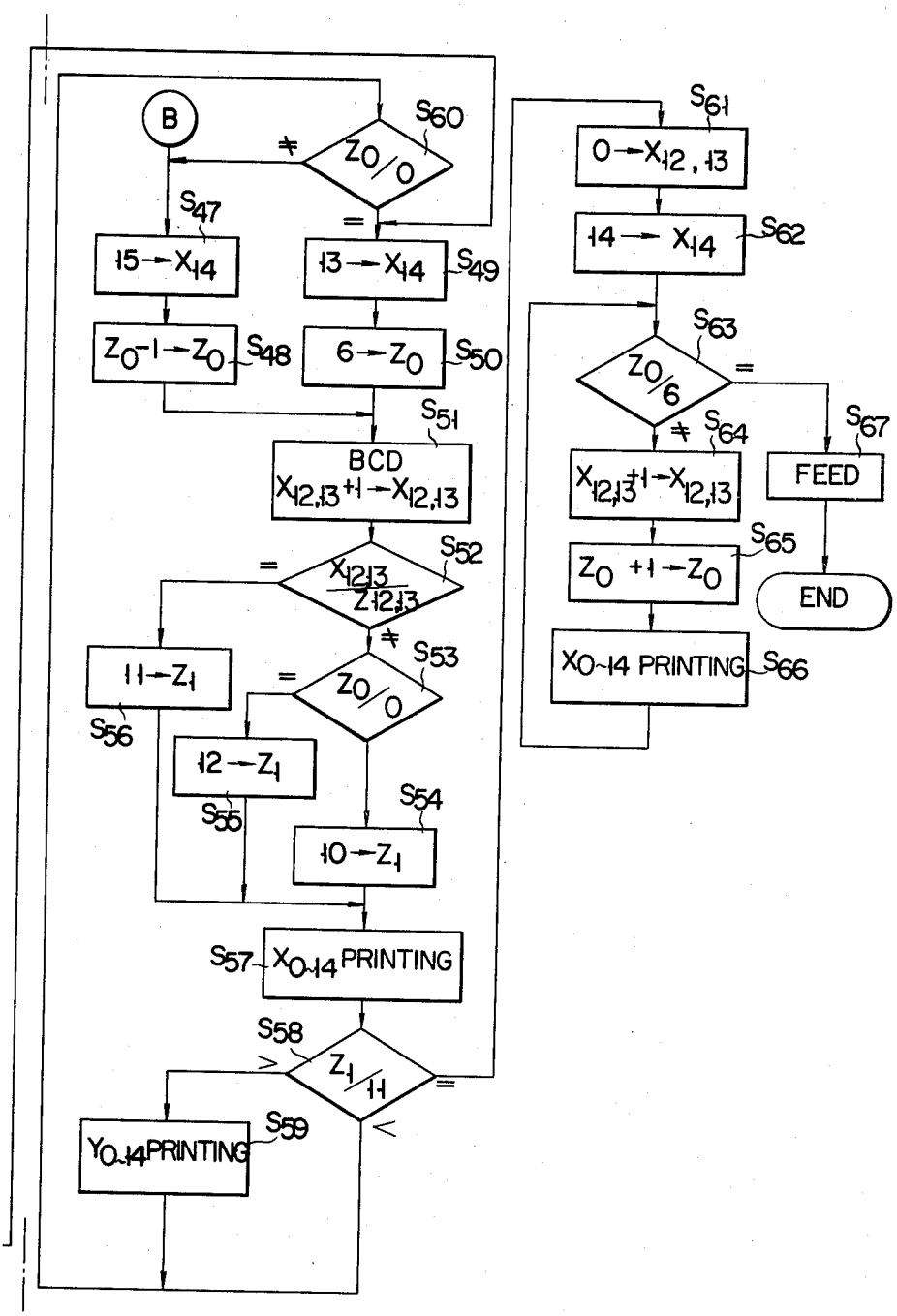

The operation for preparing the calendar schedule table of the printing calculator of this construction will be described below. For preparing a calendar schedule for February of 1980, the entry keys of the keyboard 1 are operated to input the year $\boxed{1}\ \boxed{9}\ \boxed{8}\ \boxed{0}$, and thereafter the $\boxed{Y/M}$ key and the entry key $\boxed{2}$ are operated. Then the input data is supplied through the input control part 2, the data bus line DB1, the operation circuit 6, and the data bus line DB5 to the RAM 7 which is set in the writing mode. The date data of "1980-02" is stored in the digits X6 to X12 of the X register. When the $\boxed{Y/M}$ key is operated thereafter, the operation represented by the flow chart shown in FIGS. 7A and 7B is executed.

During the execution of step S31, in response to the address signal specified by the address part 14, the operation code Op is fed from the control part 9 to the operation decoder 10 for reading. As a result, the operation decoder 10 feeds a reading signal to the RAM 7, the control signal e to the column address part 15, the printing control signal p to the printing control part 4, and the gate control signal a to the gate circuit 8a to open the gate. Simultaneously, the line address signal Ua is supplied from the control part 9 to the RAM 7 for specifying the X register, and the column address signal La is supplied to the column address part 15. The column address part 15 sequentially reads out the date data of the digits X12 to X6 of the X register, and this data is supplied to the printing buffer register PB in the printing control part 4 through the data bus line DB2, the gate circuit 8a, and the data bus line DB1. The printing drive signal MD, based on the content of the printing buffer register PB, is fed to the printing part 3. After "1980-02" is printed on the recording paper as shown in FIG. 5, the recording paper is fed out a distance corresponding to one line.

A step S32 is then executed. The year and month data stored in the X register is read out and fed to the operation circuit 6. The operation circuit 6 then judges, based on the year and month data, whether or not the month has 31 days and whether or not the year is a leap year. As a result, the last day of the month is calculated and is stored in the digits Z12, Z13 of the Z register. In the case of February, "29" is calculated as the data of the last day of the month and is stored in the digits Z12, Z13.

A step S33 is then executed. Based on the year and month data, the day of the week of the first day of the month is calculated in the operation circuit 6. The calculation of the day of the week in this case is the same as in the step S3 of FIG. 4. In the case of Feb. 1, 1980, the number of days "723167" from the reference date is calculated by the relation (2), substituting a=1980, b=2, and c=1 in this equation. The number of days "723168" obtained by the addition of 1 to this number is divided by "7" leaving the remainder "5". This remainder represents the day of the week. Thus, it is seen that Feb. 1, 1980 is a Friday. The result is supplied to the RAM 7 through the data bus line DB5, and the data "5" is stored in the digit Z0 of the Z register specified by the line address signal Ua and the column address signal La from the control part 9.

A step S34 is then executed. "0" is stored in the digits X0 to X14 of the X register. As a result, the date data stored in the digits X6 to X12 is cleared. A step S35 is then executed, and 1 is subtracted from the content "0" of each of the digits X0 to X11. Consequently, the blanking code "15" is written in the digits X0 to X11, each having a memory capacity of 4 bits. A step S36 is then executed, and "14" as a decimal point code is written in the digit X6 of the X register.

A step S37 is then executed. A judgement is made as to whether or not the content of the digit Z0 of the Z register is "0", that is, whether or not the day of the week of the first day of the month is Sunday. If the answer is positive or YES, a step S38 is executed. During the execution of the step S38, the decimal point code "14" is stored in the digit X14 of the X register. Then a step S39 is executed. The last day of the preceding month is calculated in the same manner as in the step S32, and the data for the last day is stored in the digits X12, X13 of the X register. A step S40 is then executed. The data for the last day of the preceding month stored in the digits X12, X13 is transferred to the digits Y12, Y13 of the Y register. A step S41 is then executed. The control signals d, s are fed from the operation decoder 10 to the operation circuit 6. As a result, the operation circuit 6 is set in the adding mode in the BCD notation, and thereafter the data of the day of the week for the first day of the present month stored in the digit Z0 is subtracted from the data of the last day of the preceding month stored in the digits X12, X13. The result is stored in the digits X12, 13. A step S42 is executed in which "1" is added to the data stored in digits X12, X13. The result is stored in these digits X12, X13. A step S43 is then executed wherein the data stored in the digits X0 to X14 of the X register is fed to the printing control part 4 and is printed at the printing part 3 on the recording paper. A step S44 is then executed. The data of the last day of the preceding month stored in the digits Y12, Y13 is compared with the date data stored in the digits X12, X13 at the operation circuit 6. If they are judged as not the same, the operation is returned to the step S42 and the steps S42, S43 and S44 are repeated until the data coincide. Thus, as a result of the steps S38 to S43, the data "31" for the last day of the preceding month (January of 1980) is calculated and stored in the digits X12, X13. After the result is transferred to the digits Y12, Y13, the data "5" for the day of the week of the first day of the present month is subtracted from the data "31" of the last day of the preceding month. The result "26" is then stored in the digits X12, X13, and 1 is added thereto to obtain the result "27". Then the contents "14, 2, 7, 15, 15, 15, 15, 15, 14, 15, 15, 15, 15, 15, 15" of the X register are transferred to the printing part 3 and are printed on the recording paper. Then the steps S44, S42 and S43 are repeatedly executed. Consequently, the dates "27" to "31" corresponding to Monday through Thursday are printed sequentially on separate lines on the recording paper, and before each of the dates is printed the decimal point "." which indicates that these are the dates of the preceding month. Thus, during the sixth execution of the step S14, the contents of the digits X12, X13 and the contents of the digits X12, X13 are judged to be the same so that step S45 may be initiated.

In executing the step S45, "0" is stored in the digits X12 to X14. Then the decimal point code "14" and the date data for the preceding month are cleared. A next step S47 is then executed in which the blanking code "15" is stored in the digit X14. A next step S48 is then executed wherein 1 is subtracted from the data on the day of the week of the first day of the present month stored in the digit Z0. The result is stored in the digit Z0. A next step S51 is then initiated. During the step S37 if the data on the day of the week of the first day of the present month stored in the digit Z0 is judged to be equal to "0", that is, Monday, a step S49 is executed. In the step S49, a non-address code "13" is stored in the digit X14. A next step S50 is then initiated. The data "6" for the day of the week is stored in the digit Z0, and the next step S51 is executed. During the execution of the step S51, the operation circuit 6 is set in the adding mode in the BCD notation, and "1" is added to the date data stored in the digits X12, X13; the added result is stored in the digits X12, X13 for updating the date data. A next step S52 is executed and a judgement is made as to whether or not the date data for the present month stored in the digits X12, X13 is equal to the data for the last day of the present month stored in the digits Z12, Z13. When the answer is negative, a step S53 is initiated. In the execution of the step S53, a judgement is made as to whether or not the data for the day of the week stored in the digit Z0 is equal to "0". If the answer is negative, a next step S54 is initiated. In the execution of the step S54, a flag "10" is set in the digit Z1, and a next step S57 is initiated. In the step S53, when the digit Z0 is judged to be equal to "0", a step S55 is executed in which a flag "12" is stored in the digit Z1. Then the step S57 is executed. In the step S52, if it is judged that the date data of the digits X12, X13 is equal to the data for the last day of the month in the digits Z12, Z13, a step S56 is executed. A flag "11" is stored in the digit Z1, and the next step S57 is executed. In the step S57, the data stored in all the digits X0 to X14 of the X register is fed to the printing control part 4 and printed at the printing part 3 on the recording paper. A next step S58 is executed. It is judged whether or not the flag stored in the digit Z1 is equal to, greater than or less than "11". If it is judged to be greater than "11", a step S59 is executed. In the step S59, the minus code "10" stored in all of the digits Y0 to Y14 of the Y register is fed to the printing control part 4 and is printed at the printing part 3 on the recording paper and a step S60 follows. In the step 58, if it is judged that the flag of the digit Z1 is less than "11", the step S60 is initiated. In the step S60, it is judged whether or not the data for the day of the week stored in the digit Z0 is equal to "0" representing Sunday. If the answer is positive, the step 49 is executed. If the answer is negative, the step S47 is executed. Thus, steps S45 to S48, S51 to S54, and S57 are sequentially executed after printing dates 27 to 31 of January on the recording paper. Consequently, the date "01" of the present month is printed on the recording paper. Then, after the steps S58, S60, S47, S48, S51, S53, S55 and S57 are sequentially executed, the date "02" is printed on the next part of the recording paper. As a result, the dates "27" to "31", "01" and "02" of one week are printed. Thereafter, the steps S58 and S59 are sequentially executed, and broken lines indicating separations between weeks are printed. Then the steps S60, S49 to S54, and S57 are executed, and the date "03" and the symbol "#" representing Sunday are printed on the recording paper. Thereafter, the steps S59, S60, S47, S48, S51 to S54, and S57 are repeated five times, and the steps S58, S60, S47, S48, S51, S53, S55 and S57 are performed so that the dates "03" to "09" of the next week are printed on the recording paper. After repeating such operations, in the 29th execution of the step S52, the date data of the digits X12, X13 is judged to be equal to the data "29" for the last day of the present month in the digits Z12, Z13. Consequently, the steps S56, S57 are executed so that the dates for February of 1980 are all printed on the recording paper. During the execution of the step S58, the flag of the digit Z1 is judged to be equal to "11", and a step S61 is initiated.

Figure 8:
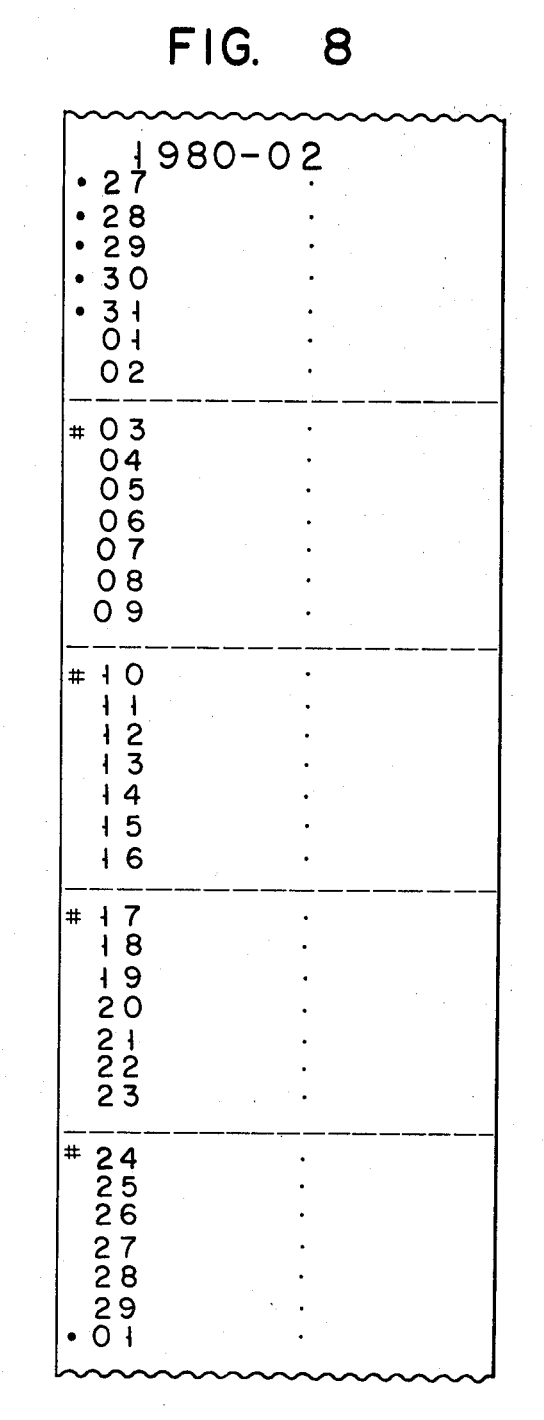

In the execution of the step S61, "0" is stored in the digits X12, X13. Then a step S62 is initiated, and the decimal point code "14" is stored in the digit X14. Then a step S63 is executed wherein it is judged whether or not the day data stored in the digit Z0 is equal to "6" representing Saturday. If the answer is negative, a step S64 is executed. In the execution of the step S64, "1" is added to the content of each of the digits X12, X13, and the obtained result is stored in the digits X12, X13. Then a step S65 is executed wherein "1" is added to the day data stored in the digit Z0, and the obtained result is written in the digit Z0. Then a step S66 is executed. The data stored in all of the digits X0 to X14 of the X register is printed at the printing part 3, and the step S63 is executed. After the last day "29" of the present month is printed on the recording paper, the step S63 is executed. In the execution of the step S63, the data "5" representing Friday stored in the digit Z0 is judged not to be equal to "6" and the steps S64, S65, and S66 are sequentially executed. As a result, the date "01" is printed on the recording paper as well as the decimal point "." which represents that this date is in the next month. As a result, dates "24" to "29" and "01" for one week are printed. Finally, during the steps S63, the data on the day of the week is judged to be equal to "6". A step S67 is then executed, and the recording paper is fed out a predetermined length to complete the preparation of the calendar schedule table, and the calendar schedule table as shown in FIG. 8 is issued.

In the second embodiment, the data on the day of the week for the first day of the present month was automatically calculated (the step S33) and, based on this, the data on the day of the week for the last day of the month was automatically calculated. However, the present invention is not by any means limited to this specific construction, but another construction may be adopted wherein the day of the week of the first day or the last day of the present month is input by operation of an entry key.

Further, the first and second embodiments have been described with reference to the preparation of monthly calendar schedule tables. However, the present invention is not limited to this, but a weekly calendar schedule table may alternatively be prepared. Still alternatively, calendar schedules for a period from a desired date to another desired date may be prepared.

In the first and second embodiments, Sunday was represented by the symbol "#". However, the present invention is not limited to this and symbols such as Chinese characters and alphabets may alternatively be used. The dates of Sundays may be printed red and the dates of other days of a week may be printed a different color. This is not particularly limited to Sundays but every day of the week may be represented by different symbols.

In the first and second embodiments, the present invention has been described with reference to a portable electronic calculator with a printer. However, the present invention is not by any means limited to this, but may be applied to other small electronic apparatus having a printing function, such as an electronic register.

In the first and second embodiments, the present invention has been described with reference to the preparation of a calendar schedule table. A third embodiment will be described in which a time schedule with times printed with predetermined spaces therebetween is automatically prepared by a simple operation.

FIG. 9 shows the construction of the RAM 7 in the case of the third embodiment. Various registers such as the X register, the Y register, the Z register, the A register, the B register and so on are provided in correspondence with each line address. Each of the registers has a memory capacity of 16 digits, the digits corresponding to column addresses 0–15. For preparing a time schedule table, initial time data is stored in the digits X10 to X14 of the X register, the time interval is stored in the digits Y10, Y11 of the Y register, the date data is stored in the digits Z5 to Z14 of the Z register, the terminal time data is stored in the digits B10–B14 of the B register, and the bar code is stored in the digits A0 to A14 of the A register. A blanking code is stored in the digits X0 to X9 of the X register, and in the digits Z0 to Z4 of the Z register. The digits X15, Y15, Z15, A15, and B15 corresponding to the column address 15 are not directly used in the printing in this embodiment.

Figure 10:
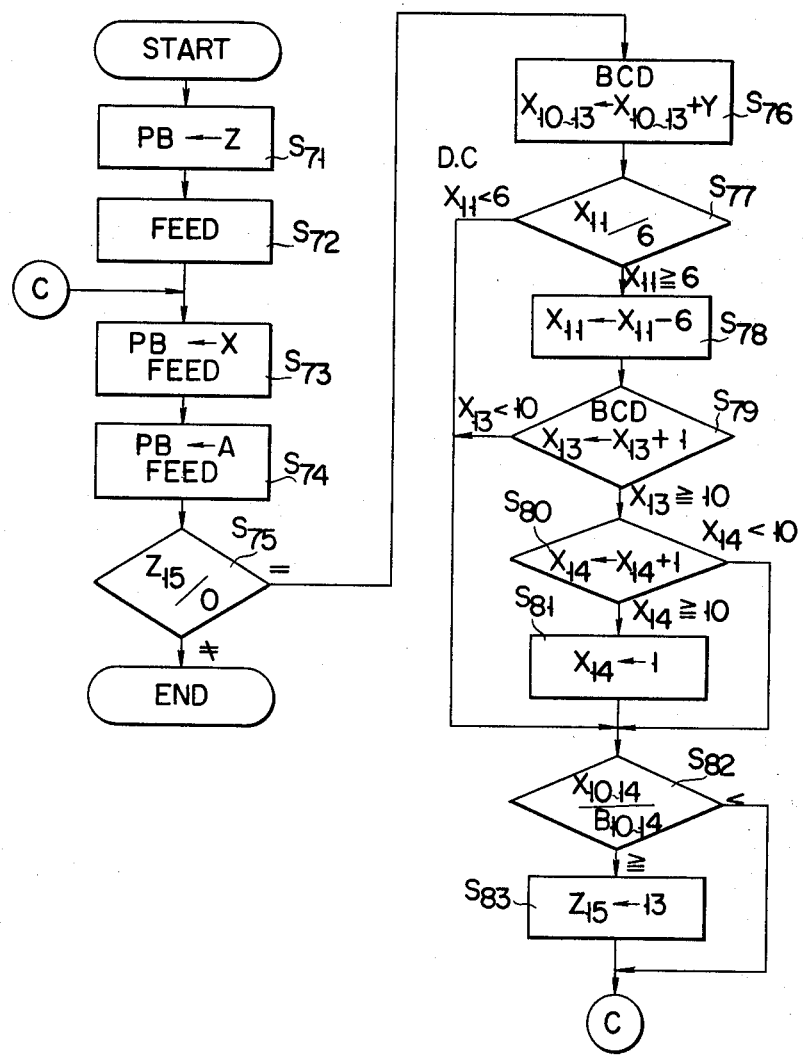
FIG. 10 is a flow chart explaining the preparation operation of a time schedule table.

The operation of the third embodiment for preparing a time schedule table will be described. $\boxed{1}\,\boxed{9}\,\boxed{7}\,\boxed{9}$ is input by operating the entry keys of the keyboard 1. Thereafter, the entry key $\boxed{0}\,\boxed{8}$, the entry key $\boxed{3}\,\boxed{0}$, and the $\boxed{Y/M}$ key are operated in the order named to input Aug. 30, 1979. This operating signal is fed to the RAM 7 through the input control part 2, the data bus line DB1, the operation circuit 6, and the data bus line DB5. The data information "1979 - 8 - 30" is stored in the digits Z6 to Z14 of the Z register as shown in FIG. 3. For printing a time schedule of 30 minute intervals from 9 to 15 o'clock, the entry key $\boxed{9}$ and the $\boxed{H/M}$ key are sequentially operated, and the initial time "9:00" is stored in the digits X10 to X13. When the entry key $\boxed{1}\,\boxed{5}$ and the $\boxed{H/M}$ key are sequentially operated, the terminal time "15:00" is stored in the digits B10 to B14 of the B register. When the entry key $\boxed{3}\,\boxed{0}$ and the $\boxed{H/M}$ key are sequentially operated, the interval "30" to be printed is stored in the digits Y9, Y10 of the Y register. When the input operation is completed, the step S71 of the flow chart shown in FIG. 10 is executed.

In the step S71, in response to the address signal specified by the address part 14, the operation code Op is fed from the control part 9 to the operation decoder 10. Consequently, the operation decoder 10 feeds the reading signal to the RAM 7; the control signal e to the column address part 15; the printing control signal p to the printing control part 4; and the gate control signal a to the gate circuit 8a for opening the gate. Simultaneously, the line address signal Ua is fed from the control part 9 to the RAM 7 for specifying the X register and the column address signal La is fed to the column address part 15. The data of the digits Z14 to Z0 of the Z register is read out sequentially by the column address part 15, and is fed to the printing buffer register PB in the printing control part 4 through the data bus line DB2, the gate circuit 8a, and the data bus line DB1. Thus, the printing drive signal MD, based on the content of the printing buffer register PB, is fed to the printing part 3 and the date data is printed on the recording paper, as shown in FIG. 11. Then, a step S72 is executed so that the recording paper is fed out a predetermined length.

When the step S72 is completed, the operation decoder 10 which has received the detection signal f from the column address part 15 feeds the control signal g to the address buffer 13 in a step S73. Simultaneously, the next address signal Na is transferred from the control part 9 to the address buffer 13. Consequently, the initial time data stored in the X register of the RAM 7 is read out and printed on the recording paper in a manner similar to that described hereinbefore. The recording paper is thereafter fed out a predetermined distance. A step S74 is then executed. The bar code stored in the A register in the RAM 7 is read out and printed on the recording paper, and the recording paper is thereafter fed out a predetermined distance.

A step S75 is then executed. It is judged whether or not the content of the digit Z15 of the Z register is equal to "0". If the answer is positive, a step S76 is executed. If the answer is negative, the printing operation is terminated. In the case of the example, Z15 is 0, as shown in FIG. 9, so that the answer is positive. Therefore, the next step S76 is executed. The operation decoder 10 inputs the control signals d, s, the operation circuit 6 is set in the mode for addition in BCD notation, and the control signals a, b are also outputted so that the gates of the gate circuits 8a, 8b are open. In the execution of the step S76, the initial time data "9:00" stored in the digits X10 to X13 of the X register is read out and is fed to the operation circuit 6 through the gate circuit 8a. The time interval data "30" stored in the digits Y10, Y11 is read out and is fed to the operation circuit 6 through the gate circuit 8b. Both data supplied to the operation circuit 6 are added in the BCD notation. The obtained result is again stored in the digits X10 to X13 of the X register through the data bus lines DB5.

A next step S77 is executed. It is judged whether or not the content of the digit X11 of the X register is less than, or is greater than or equal to "6". When it is judged to be greater than or equal to "6", a next step S78 is executed. When it is judged to be less than "6", a next step S82 is executed. By the addition in the step S76, it is judged whether or not the digit for the minutes data indicates more than 60 minutes. In the case of the example, the content of the digital X11 is "3" so that the step S82 is then executed. In the step S82, the renewed time data "9:30" in the digits X10 to X14 and the terminal time data "15:00" in the digits B10 to B14 of the B register are read out to be supplied to the operation circuit 6. It is judged whether or not the renewed time data is more than or equal to the terminal time data. If the answer is positive, a step S83 is executed. If the answer is negative, the operation returns to the step S73. In the case of the example, the answer is judged negative so that the step S73 is executed.

The steps S73, S74 are executed in the same manner as described hereinbefore. Then, the renewed time data "9:30" and the bar code " - - - " are printed for each line. In the execution of the step S75, the content of the digit Z15 of the Z register is judged to be equal to "0", and "30" is added to the renewed time data "9:30" in the digits X10 to X13 of the X register. Thus, the content of the digits X10 to X13 is changed to "9:60". In the execution of the next step S77, the content of the digit X11 of the X register is judged to be greater than or equal to "6" and the next step S78 is executed.

In the execution of the step S78, the control signal c is output from the operation decoder 10 to open the gate of the gate circuit 8c. The numerical code signal C0 is then output from the control part 9, "6" is fed to the operation circuit 6 through the gate circuit 8c. Simultaneously, the conditions of the control signals d, s fed to the operating circuit 6 from the operation decoder 10 change, so that the operating circuit 6 is placed in the subtraction mode in hexadecimal notation. Thus, in the operation circuit 6, "6" is subtracted from the content "6" of the digit X11, and the obtained result "0" is output to be stored in the digit X11. A next step S79 is then executed. The operating circuit 6 is set in the mode for addition in the BCD notation while "1" is added to the content of the digit X13. The added result is outputted to be stored in the digit X13. It is judged whether the content of the digit X13 is less than "10", or greater than or equal to "10". If it is greater than or equal to "10", a next step S80 is executed. If it is judged to be less than "10", the next step S82 is executed. In the case of the example, the content of the digit X13 is equal to "10", so that the step S80 is executed. "1" is added to "14" stored in the digit X14 as a blanking code, and the content becomes "15". It is then judged whether the content of the digit X14 less than "10", or greater than or equal to "10". If it is judged to be greater than or equal to "10", a next step S81 is executed. If it is judged to be less than "10", a next step S82 is executed. In the case of the example, the step S81 is executed and the content "15" of the digit X14 is changed to "1". When the step S81 is executed a second time, the content of the digit X14 is rewritten as "2". Then the a step S82 is executed. The content "10:00" of the digits X10 to X14 is judged to be less than the content "15:00" of the digits B10 to B14, so that the operation returns to the step S73 for a third execution.

When the above-mentioned operations are repeated and the step S82 is executed twelve times, the content "15:00" of the digits X10 to X14 is judged to be greater than or equal to the terminal time of the digits B10 to B14 so that a step S83 is executed. In the execution of the step S83, the content "0" of the digit Z15 is changed to "13" and is stored as a flag. Then the steps S73, S74 are executed a thirteenth time. In the execution of the step S75, the content of the digit Z15 is judged not to be equal to "0", and the printing operation is terminated. Consequently, the time schedule table as shown in FIG. 11 is prepared on the recording paper.

Figure 12:
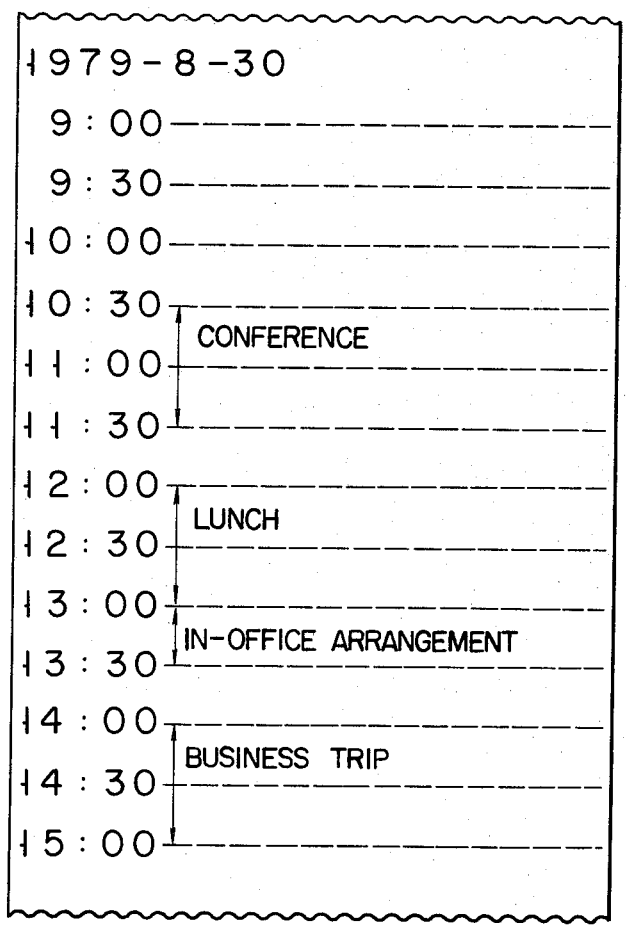

FIG. 12 shows another embodiment of a time schedule which is prepared by storing bar codes instead of blanking codes in the digits X0 to X9 of the X register in the above embodiment. In the case of the example, the A register is not used, so that the step S74 is not executed.

In the third embodiment, the time data was printed at the left end of each line of the recording paper for preparing a time schedule table. However, the present invention is not limited to this particular example. For example, the data may be printed at the right end or at a specified position on the recording paper.

In the third embodiment, the time data was printed for each line of the recording paper. However, the present invention is not limited to this particular example. For example, a particular time data may be printed every several lines, and symbols representing the time may be printed on the rest of the lines.

In the third embodiment, the present invention has been described with reference to an electronic calculator with a printer. However, the present invention is not limited to this particular example, but may be applied to portable electronic equipment having a printing function.

What is claimed is:
1. A schedule table printing apparatus comprising:
 a keyboard for entering data defining the period of time assigned to a table to be printed;

first memory means coupled to said keyboard for storing data entered by operating said keyboard;

data entering means coupled to said first memory means for entering, by operating said keyboard, data representing regular intervals within the period of time represented by data read from said first memory means;

second memory means coupled to said data entering means for storing data read out from said data entering means; and printing means coupled to said second memory means for printing data read out from said second memory means, said data read out from said second memory means being printed one by one as they are sequentially supplied from the second memory means, said printing means further including means for feeding a sheet of paper for a distance corresponding to said regular interval, upon printing one data read out from said second memory means.

2. The schedule table printing apparatus of claim 1, wherein said keyboard includes a key for entering data representing a one-month period; said data entering means includes means for entering data representing days of the month; and said printing means prints days of the month on a sheet of paper, thereby printing a calendar schedule table for a month.

3. The schedule table printing apparatus of claim 1, wherein said keyboard includes an entry key for entering data representing a week time period; said data entering means includes means for entering data representing a date; and said printing means prints days of a week on a sheet of paper, thereby printing a calendar schedule table for said week time period.

4. The schedule table printing apparatus of claim 1, wherein said keyboard includes an entry key for entering an initial date and a terminal date to define said period of time for said table to be printed; said data entering means includes means entering data representing a date; and said printing means prints a calendar schedule table from said initial date to said terminal date responsive to said entered data.

5. The schedule table printing apparatus of any one of claims 2, 3 or 4, wherein said data entering means includes means for calculating a day of the week from a date stored in said second memory means; and said printing means prints said calculated day of the week together with the date.

6. The schedule table printing apparatus of any one of claims 2, 3 or 4, wherein said keyboard includes a key for inputting data corresponding to the day of the week; said data entering means includes means for renewing the date by adding or subtracting a given value therefrom when each date is printed, and for simultaneously renewing said input data corresponding to the day of the week when renewing the date; said printing means prints the day of the week together with the date.

7. The schedule table printing apparatus of claim 6, wherein said data entering means includes means for detecting data indicating a Sunday among the data on the day of the week renewed by said data entering means; and said printing means includes means responsive to said detected data for printing a special mark representing Sunday, together with the date.

8. The schedule table printing apparatus of claim 6, wherein said data entering means includes means for detecting data corresponding to a particular day of the week among the data on the day of the week renewed by said operating means; and said printing means includes means responsive to said detected data on a particular day of the week for printing a distinctive mark for each week when said data on said particular day of the week is detected.

9. The schedule table printing apparatus of claim 6, wherein said keyboard includes a key for inputting time interval data; and said printing means thereby issues a time schedule table with times printed for every said time interval.

10. The schedule table printing apparatus of claim 1, wherein said keyboard includes a data inputting key for inputting initial time data and terminal time data; said data entering means includes means for entering time data as numerical data; and said printing means thereby prints a time schedule table from said initial time to said terminal time.

11. The schedule table printing apparatus of claim 1, wherein said keyboard includes function keys for instructing at least the four fundamental arithmetic operations ($+$, $-$, $\times$, $\div$); said data entering means includes means for selectively executing said four arithmetic operations upon the operation of said function key to obtain result data; and said printing means includes means for printing said result data.

* * * * *